US009527183B1

(12) United States Patent
Hardesty

(10) Patent No.: US 9,527,183 B1
(45) Date of Patent: Dec. 27, 2016

(54) SYSTEM FOR CONFINING PARTICULATE RESIDUE IN A MACHINING OPERATION

(71) Applicant: THERMWOOD CORPORATION, Dale, IN (US)

(72) Inventor: Michael P. Hardesty, Dale, IN (US)

(73) Assignee: Thermwood Corporation, Dale, IN (US)

( * ) Notice: Subject to any disclaimer, the term of this patent is extended or adjusted under 35 U.S.C. 154(b) by 24 days.

(21) Appl. No.: 14/823,406

(22) Filed: Aug. 11, 2015

(51) Int. Cl.
*B23Q 11/00* (2006.01)
*B23C 1/00* (2006.01)

(52) U.S. Cl.
CPC ............. *B23Q 11/006* (2013.01); *B23C 1/002* (2013.01); *B23C 2230/08* (2013.01); *B23Q 11/0042* (2013.01); *Y10T 408/50* (2015.01); *Y10T 409/304088* (2015.01); *Y10T 409/307728* (2015.01)

(58) Field of Classification Search
CPC ............. B23Q 11/0042; B23Q 11/0046; B23Q 11/005; B23Q 11/006; B23Q 11/0078; B23Q 11/0057; Y10T 409/30392; Y10T 409/304088; Y10T 409/307728; Y10T 409/308288; Y10T 408/50
See application file for complete search history.

(56) References Cited

U.S. PATENT DOCUMENTS

| | | | | |
|---|---|---|---|---|
| 5,632,579 A * | 5/1997 | Susnjara | B23Q 11/0046 | 408/67 |
| 6,059,494 A * | 5/2000 | Susnjara | B23Q 11/006 | 408/11 |
| 2003/0080096 A1* | 5/2003 | Yamaguchi | B23K 37/0461 | 219/121.39 |
| 2005/0067054 A1* | 3/2005 | Alexin | B23K 37/0461 | 148/194 |
| 2008/0247835 A1* | 10/2008 | Murota | B23Q 11/0046 | 409/134 |

FOREIGN PATENT DOCUMENTS

| | | | |
|---|---|---|---|
| FI | WO 9316334 A1 * | 8/1993 | F24F 3/1607 |
| JP | 11267942 A * | 10/1999 | |
| JP | 2001322048 A * | 11/2001 | |

* cited by examiner

*Primary Examiner* — Daniel Howell
*Assistant Examiner* — Nicole N Ramos
(74) *Attorney, Agent, or Firm* — Bookoff McAndrews, PLLC

(57) ABSTRACT

An assembly for the removal of particulate residue generated by a CNC machine including a first means mounted on a gantry thereof for directing a stream of air downwardly toward a worktable thereof and at a degree toward a tool holder thereof effective to form an air current across a forwardly disposed opening of such gantry and entrain particulate residue, a second means mounted on such gantry rearwardly of such first means for directing a stream of air downwardly toward such worktable and to a degree toward such tool holder effective to form an air curtain across a rearwardly disposed opening of such gantry and entrain particulate residue and means mounted on such gantry for exhausting air entrained with such particulate residue from within such gantry between such air curtain.

10 Claims, 3 Drawing Sheets

SYSTEM FOR CONFINING PARTICULATE RESIDUE IN A MACHINING OPERATION

This invention relates to a system for preventing the dispersion of deleterious particulate material, and more particularly to such a system for preventing the dispersion of particulate residue produced by a CNC machine, into the ambient atmosphere.

BACKGROUND OF THE INVENTION

In the conventional use of CNC machines for cutting various materials, particulate residue in the form of dust, chips and the like is produced and often dispersed. Such dispersion of residue can be detrimental, posing a nuisance to a machine operator and others, and causing an accumulation of suspended particles in the air, physical hazards such as flammability and combustibility, health hazards and possibly contamination of other materials. In view of the prospects of such occurrences, the principal object of the present invention is to provide a system for a CNC machine, functional to confine within an enclosure thereof, particulate residue produced in the machining of various workpieces otherwise tending to migrate to the ambient atmosphere.

SUMMARY OF THE INVENTION

The principal object of the present invention is achieved by means of a system provided on a CNC machine functional to cut various workpieces, producing particulate residue apt to disperse into the ambient atmosphere, with such machine including a worktable mounted on a bed for supporting a workpiece, a gantry supported on such bed by a set of transversely spaced leg portions and displaceable along a y-axis, a tool carriage mounted on such gantry and displaceable along an x-axis and a holder supporting a cutting tool, mounted on such carriage and displaceable along a z-axis, with such system including a first means mounted on such gantry, spaced from such carriage, for directing a stream of air downwardly toward such worktable and at a degree toward such tool holder effective to form a curtain across a forwardly disposed opening of such gantry and correspondingly entrain particulate residue produced by such cutting tool; a second means mounted on such gantry rearwardly of such carriage for directing a stream of air downwardly toward such worktable and to a degree toward such tool holder effective to form a curtain across a rearwardly disposed opening of such gantry and correspondingly entrain particulate residue produced by such cutting tool; and means mounted on such gantry for evacuating air entrained with particulate reside from within such gantry between such air curtains.

In the preferred embodiment of such invention, the means for producing such air curtains are functional to posture at slight angles in directions towards such tool holder to assure confinement of entrained residue within the gantry and between such curtains, a hood with a brush is provided about the cutting tool to minimize the escape of residue therefrom and additional means are provided for evacuating air entrained with residue from the space within the confines of such hood and brush.

DETAILED DESCRIPTION OF THE PREFERRED EMBODIMENT OF THE INVENTION

Figure 1:
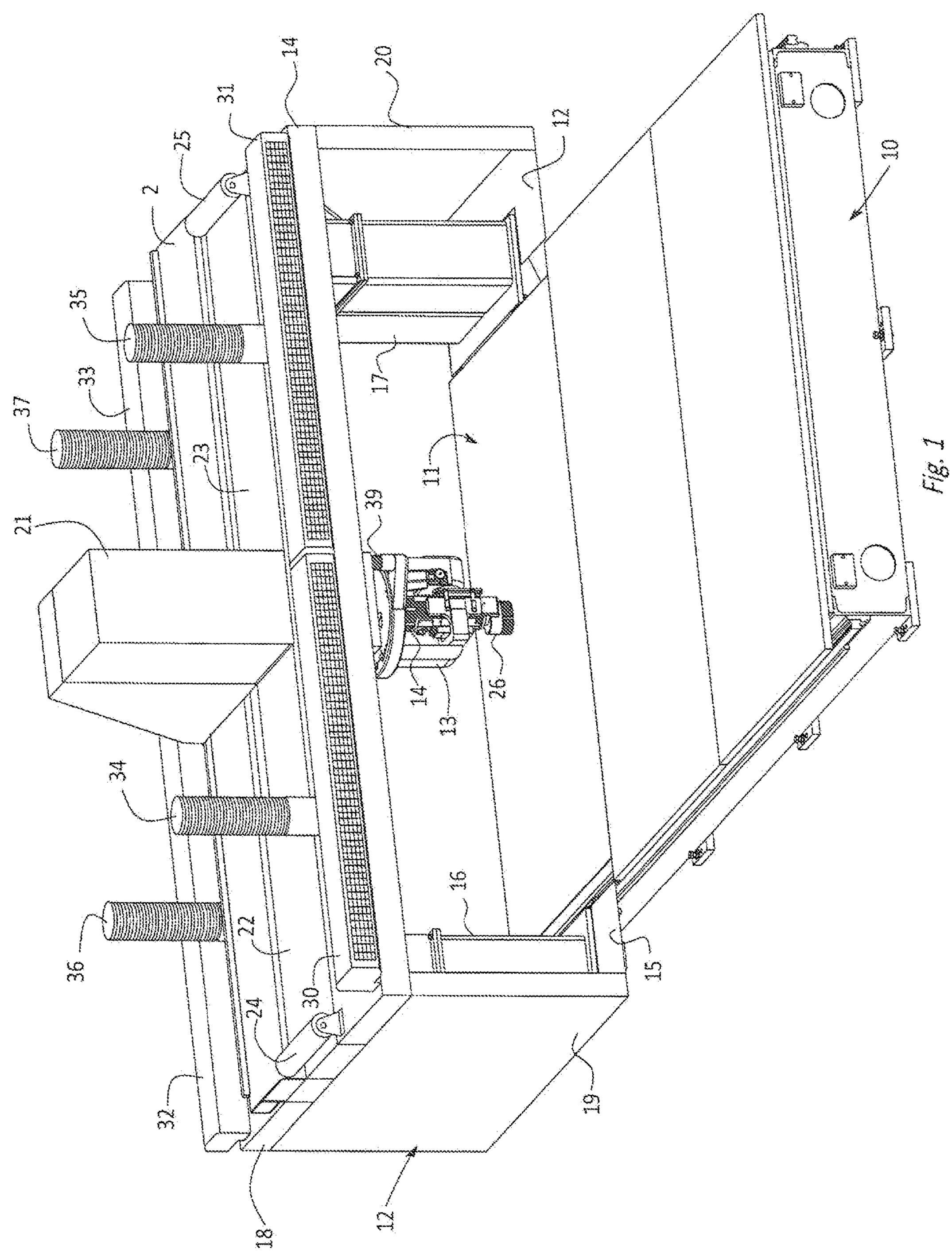
FIG. 1 is a perspective view of a CNC router machine provided with a system embodying the present invention.

Referring to FIG. 1 of the drawings, there is illustrated a CNC router machine which includes a support bed 10, a worktable 11 mounted on the support bed, disposed in an x-y plane, a gantry 12 mounted on the support bed, a tool carriage 13 mounted on the gantry, a tool holder 14 mounted on the tool carriage and a system provided on the gantry for confining particulate particles produced by the cutting tool mounted in the tool holder. The gantry is disposed along the y-axis, is displaceable along the x-axis and includes a bottom support panel 15, a pair of spaced leg portions 16 and 17, a top panel portion 18 and a set of end walls 19 and 20 spaced outwardly of leg portions 16 and 17. Bottom panel 15 is mounted on a set of guides and guided therealong by threaded members driven by servomotors operated by a control computer in the conventional manner. Carriage 13 is provided with an enclosure 21, is supported on a set of transversely disposed guide rails provided in top panel portion 18 and is displaced along such guide rails by a threaded member driven by a servomotor operated by the control computer. The upper portion of carriage 13 extending into enclosure 21 extends through a transverse opening in top panel portion 18 which is closed on each side of enclosure 21 by two flexible barrier strips 22 and 23 provided to accommodate the transverse displacement of the tool carrier, each extended and retracted by spring activated spool mechanisms 24 and 25. Tool holder 14 is mounted on a set vertically disposed guide rails on carriage 13, is displaced along such guide rails by a threaded member driven by a servomotor mounted on carriage 13 and operated by the control computer, and is provided with a hood 26 provided with a brush encompassing the cutting tool and engaging worktable 11.

Figure 2:
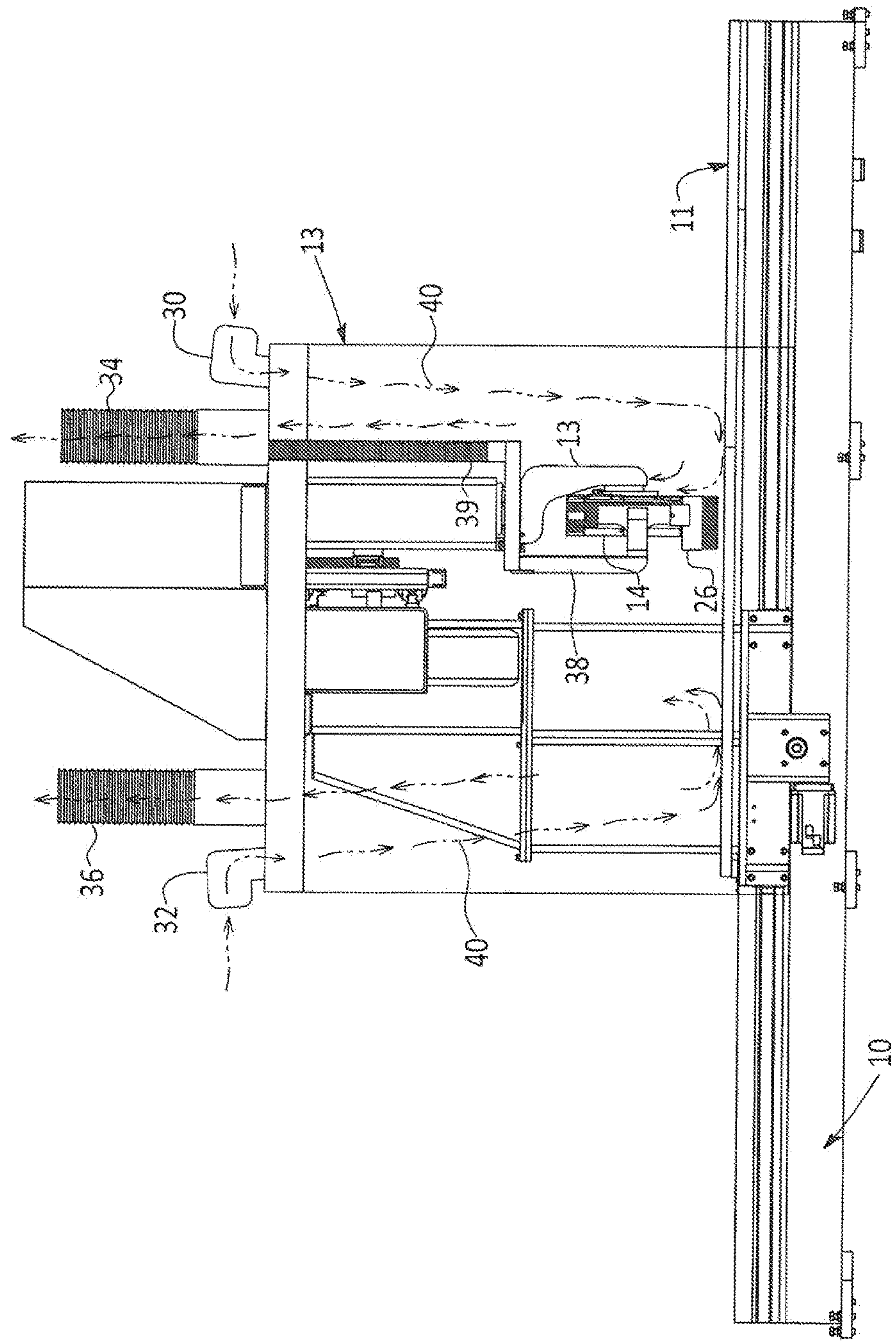
FIG. 2 is an enlarged side view of the machine shown in FIG. 1, having a side wall portion of the gantry removed to more clearly reveal the components of such system and illustrate the air curtains generated by such system.
Figure 3:
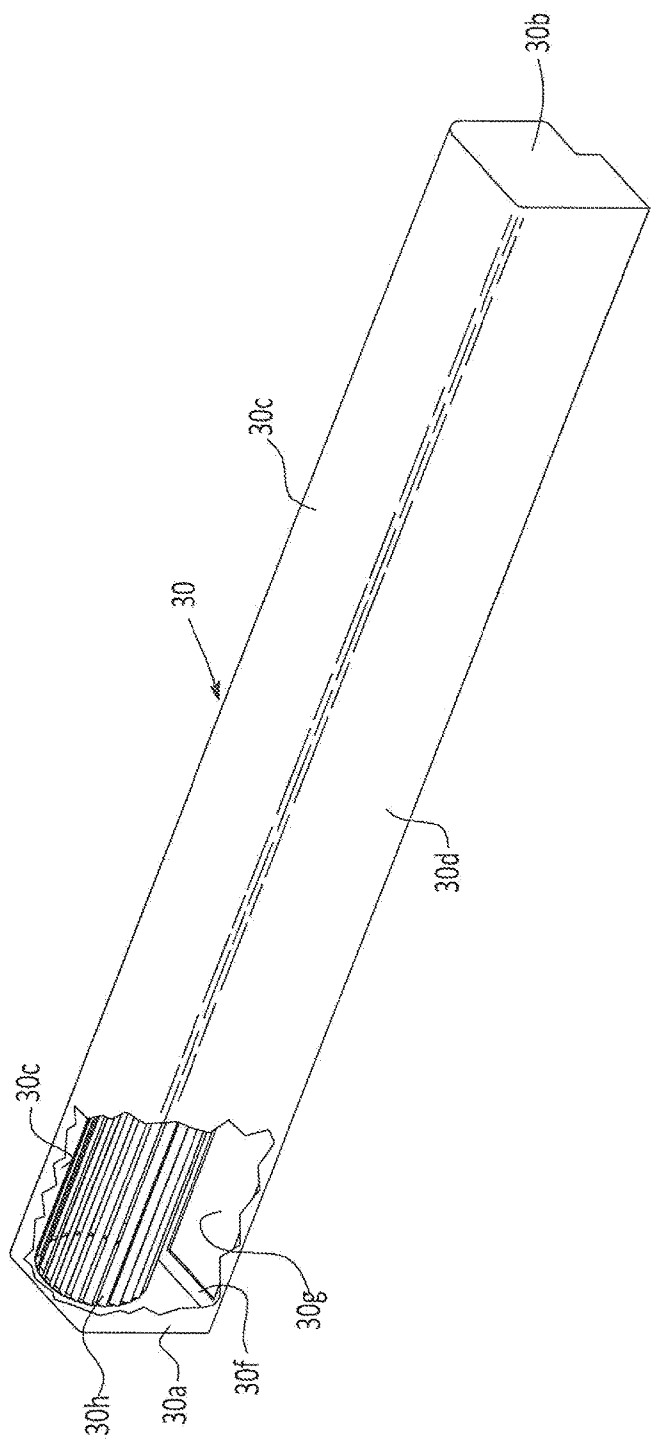
FIG. 3 is a perspective view of a component of the system functional to produce an air curtain shown in FIG. 2.

As shown in FIGS. 2 and 3, the system for containing particulate particles produced by the cutting tool includes a set of air current generators 30 through 33, a set of exhaust ducts 34 through 37, a fixed conduit 38 and a flexible conduit 39. Air current generators 30 through 33 are similarly configured and cooperable, with generators 30 and 31 being disposed in end-to-end relation, transversely atop and along a front edge of upper wall panel 18, and generations 32 and 33 being disposed in end-to-end relation, transversely atop and along a rear edge of upper wall panel 18. Referring to FIG. 3, generator 30, typical in configuration and mode of operation to each of the generators, includes an elongated enclosure including a pair of end walls 30*a* and 30*b*, each provided with laterally jutting portions, an upper wall 30*c*, a side wall 30*d*, a side wall 30*e* provided with an inlet opening aligned with and along the jutting portion of the end walls, provided with a perforated screen, and a bottom wall 30*f* provided with an elongated outlet opening 30*g*. Disposed within enclosure 30 is rotary wheel 30*h* driven by an induction motor operated either independently or by the control computer to rotate the rotary wheel and thus draw air from the exterior thereof through the perforated inlet and eject it through outlet 30*g*. The outlet opening of each of such generators communicates with a cooperable, elongated opening through upper wall panel 18 when mounted thereon. Each of such enclosures is either configured or oriented relative to upper wall panel 18 so that upon rotational operation of rotary wheel 30*b*, air drawn through the elongated perforated inlet thereof and ejected through the elongated outlet thereof and the elongated opening in upper wall 18, will cause such air to be ejected in the form of a screen 40 canted slightly inwardly with respect to the interior of the gantry thus forming a barrier precluding the flow of particular residue within the confines of the gantry and the air screen from escaping into the ambient atmosphere.

Each of exhaust ducts 34 through 37 is cylindrically configured with a closed upper end, an open lower end and a perforated side portion adjacent the closed end thereof. It is mounted upright on upper wall panel 18 adjacent to and between the ends of one of generators 30 through 33, with the lower open end thereof communicating with the space within the gantry through a passageway provided in the upper wall panel.

Fixed conduit 38 is supported on the tool carriage and is provided with an inlet communicating with tool hood 26 and an outlet communicating with an exhaust duct by means of a flexible hose 39 provided with an inlet end connected to the outlet of conduit 38 and an outlet extending through an opening in upper wall panel 18 and communicating with the lower end of exhaust duct 34, as shown in FIG. 2.

In the use of the machine as described, upon the control computer having being suitably programmed, one or more workpieces to be machined having been suitably positioned on the worktable, the induction motors of the generators activated and the operation of the machine having commenced, air will be drawn from the exterior by generators 30 through 33, ejected downwardly in the form of forwardly and rearwardly disposed air curtains 40, 40, at a slight angle to the vertical, in the direction of the tool carriage, and caused to reverse course, flow upwardly and be ejected into the exterior through exhaust ducts 34 through 37. Some of the air injected by generators 34 and 35 also will be caused to penetrate through the bristles of the brush provided on hood 26, and flow through such hood, conduit 38, flexible hose 39 and exhaust conduit 34 to be discharged into the exterior.

With the inner space defined by the gantry being closed by air screens 40, 40, and the operating program being executed, the gantry will be free to displace along the x-axis, the tool carriage will be free to displace along the y-axis and the tool would be fee to displace along the z-axis to provide the prescribed cutting pattern. Under such operating condition, air screens 40, 40 will prevent particulate residue produced by the cutting tool from migrating forwardly and rearwardly out of the confines of the gantry, a substantially portion of such reside will be entrained in the injected air within the confines of the gantry and exhausted through the exhaust ducts, and residue disposed within hood 26 and the attached brush similarly will be entrained by the injected air, caused to flow through fixed conduit 38, flexible hose 39 and exhaust duct 34 and be discharged into the atmosphere.

In the arrangement as described, the cutting tool is free to displace along the x, y and z axis with particulate residue produced by the operation of such tool being confined with the space of the gantry.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. An assembly for the removal of particulate residue generated by a CNC machine provided with a bed, a worktable mounted on said bed, a gantry supported by a set of transversely spaced leg portions on said bed and displaceable along an x-axis, a tool carriage mounted on said gantry and displaceable along a y-axis and a holder supporting a cutting tool mounted on said carriage and displaceable along a z-axis comprising:

a first means mounted on said gantry, spaced from of said carriage for directing a stream of air downwardly toward said worktable and at a degree toward said tool holder effective to form an air curtain across a fowardly disposed opening of said gantry and entrain particulate residue produced by said cutting tool;

a second means mounted on said gantry rearwardly of said carriage for directing a stream of air downwardly toward said worktable and to a degree toward said tool holder effective to form an air curtain across a rearwardly disposed opening of said gantry and entrain particulate residue produced by said tool; and means mounted on said gantry for exhausting air entrained with said particulate residue from within said gantry between said air curtains.

2. The assembly of claim 1 wherein said first and second means are functional to direct a curtain of air at a slight angle relative to a vertical plane, toward said tool holder, sufficient to entrain particulate residue produced by said cutting tool.

3. The assembly of claim 1 wherein each of said first and second means is disposed along the transverse expanse of said gantry and include an inlet communicable with the exterior and an outlet communicable with the space defined by said gantry.

4. The assembly of claim 1 wherein said means for receiving air entrained with said particulate residue comprises at least one exhaust duct.

5. The assembly of claim 1 wherein said tool holder includes a tool hood provided with a brush about a lower perimeter thereof and the means for conveying air entrained with particulate residue provided by said cutting tool within said brush to said exhaust means mounted on said gantry.

6. The assembly according to claim 5 wherein said means for conveying air entrained with particulate residue produced by said tool within said tool hood includes a flexible and extendable hose, adaptable to accommodate the displacement of said tool holder along the y and z-axes.

7. The assembly of claim 1 wherein said gantry includes a transversely disposed portion spaced from said worktable, said carriage is suspended below thereof and said first and second means functional in directing streams of air downwardly and said means for exhausting air entrained with said particulate residue are mounted thereon.

8. The assembly of claim 1 including at least one of each of said first and second means, including an elongated housing providing an elongated inlet opening along a side wall thereof communicating with the exterior and an elongated outlet opening about a base wall thereof communicating through an opening in an upper portion of said gantry with the open space within said gantry, a rotary blower disposed within and journalled in end walls of said housing and an induction motor operatively connected thereto.

9. The assembly of claim 1 wherein each of said means for exhausting said air entrained with said particulate residue includes a housing including a closed end, an open end communicating with the space defined by said gantry through an opening therethrough and a side wall provided with perforated air discharge openings.

10. The assembly according to claim 9 including a plurality of said means for exhausting said air entrained with said particulate residue, mounted on said gantry and communicable with spaced portions of the space defined by said gantry.

* * * * *